Patented May 7, 1940

2,199,839

UNITED STATES PATENT OFFICE 2,199,839

ESTERS OF 6-AMINO-NICOTINIC ACID

Raemer R. Renshaw, New York, and Paul F. Dreisbach, Yonkers, N. Y., assignors to Pyridium Corporation, Nepera Park, N. Y., a corporation of New York No Drawing. Application February 28, 1938, Serial No. 193,080

9 Claims. (Cl. 260—295)

Our invention relates to anesthetics of the pyridine series and the methods of preparing them.

It has been stated that the production of anesthesia is a property of the derivatives of the benzoyl group (Einhorn Liebieg's Annal, 1900, vol. 311; 1902, vol. 325; 1908, vol. 359). It is even stated that the benzoyl group could not be replaced by any other acid radicals, (Filehne, Ber. klin. Woch. 1887, p. 107; Erhlich and Einhorn, Ber. 1894, p. 1870), and that the benzoyl group acted as an "anestersiophore" group. Numerous local anesthetics have been made since the discovery of Einhorn, that the esters of p-aminobenzoic acid and hydroxybenzoic acid, and their various derivatives act more or less as anesthetics.

We have now found, that anesthetics can be produced by substituting the pyridine ring in place of the benzene ring, that is, we have produced anesthetics by esterification of p-aminopyridine carboxylic acids. We have also found that the anesthetics so prepared are less toxic than some of the analogous compounds of the benzene series.

The object of this invention is to prepare an anesthetic by esterification of an p-aminopyridine carboxylic acids.

Another object of this invention is to prepare anesthetics of the pyridine series which are more effective than the corresponding compounds of the benzene series. Other objects of this invention can be seen from the specifications.

The general formula of these simple compounds may be represented thus:

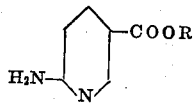

in which R represents the residue of an alkyl group. The alkyl groups in this specification refer to unsubstituted monovalent radicals derived from a saturated hydrocarbon.

Of these simple aminopyridine carboxylic acid esters, only few isomeric methyl esters are known, for example, the methyl esters of 2-amino-3-carboxy-, 3-amino-4-carboxy- and 4-amino-3-carboxy-pyridine. No 6-amino-3-carboxy-pyridine esters were made to date, nor is there any mention that the above have anesthetic properties, or are useful as therapeutic agents. The alkyl esters of 6-amino-3-carboxy pyridine prepared by us have decided anesthetic action.

The carboxy group may be esterified with alcohols, amino alcohols, alkyl-amino alcohols, dialkyl-amino alcohols with two equal or different alkyl residues of any number of carbon atoms, or with cyclo aliphatic residues such as the cyclohexyl group or cyclohexenyl group. Furthermore, N-alkyl-piperidine residue may be also used for the esterification.

The compounds of our invention are colorless, basic in character and form addition salts with mineral acids and organic acids. The base of the compounds in general is insoluble in water and soluble in most organic solvents. The salts are more or less soluble in water.

We have prepared a number of the salts of these new basic compounds. The hydrochlorides, sulfates, benzoates, cinnemates and phenyl acetates, some of which form difficultly crystallizable substances as will be noted in this specification.

These compounds appear to be diacidic bases, that is they are capable of forming addition salts with one or two molecules of acids, and we have prepared the mono- and the disalts of many of them.

In general they have high anesthetic properties and their toxicity is comparatively low.

We give the following as examples of the production of a number of compounds included within our invention:

Example 1

Dry HCl gas is passed into 30 cc. absolute ethanol cooled in an ice bath until about 1.5 g. is absorbed. Then 1 gram finely pulverized 6-amino-nicotinic acid is added. The mixture is refluxed on the steam bath for two and a half hours, excluding the moisture from the condenser with a drying tube. By this time the entire amount of the powder has gone into solution. About 20 cc. of the ethanol is then distilled off, 15 cc. of water added and the solution made alkaline with powdered sodium carbonate. The new substance, precipitated as a white crystalline powder, and is collected, dried and recrystallized from hot water.

The chemical reaction of the process is the following:

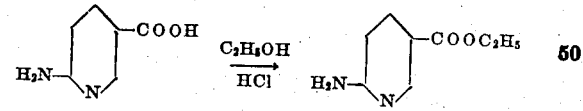

The resulting ethyl-6-amino nicotine acid forms white crystalline needles, M. P. 150–152° C.

It is soluble in alcohols and ether, insoluble in alkalies. It forms addition salts with inorganic and organic acids, which are more or less soluble in water.

The hydrochloride of ethyl-6-amino nicotinic acid:

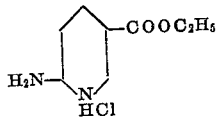

crystallizes from a mixture of alcohol and ethylacetate in colorless needles. M. P. 193°–194° C. Analytical data confirm the above formula. The hydrochloride analyzed in a nitrogen analysis (micro-Dumas) gives N=14.06%. Theoretical N=13.83%.

*Example 2*

Dry hydrochloric acid gas is passed into 35 cc. dry isopropyl alcohol until approximately 1.25 g. is absorbed. Then 0.9 g. finely pulverised 6-amino-nicotinic acid is added. The mixture is refluxed on the steam bath for 10 hours with occasional agitation. After cooling the mixture is filtered, removing some unchanged acid. The filtrate is evaporated to dryness, taken up in water and the undissolved starting material removed by filtration. The filtrate is made alkaline with sodium carbonate, the obtained free ester is collected, dried and recrystallized from ether containing about 20% petrol ether. The new substance, isopropyl-6, amino-nicotinic acid.

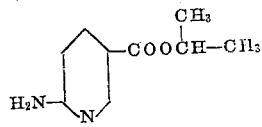

forms colorless needless from water. M. P. 113–115° C. It is slightly soluble in water, soluble in alcohols and ether, insoluble in petrol ether. The hydrochloride of isopropyl-6, amino-nicotinic acid forms colorless needless and is very soluble in water.

*Example 3*

Dry hydrochloric acid gas is passed into 35 cc. of pure n-butylalcohol cooled in an ice bath until approximately 2 g. hydrochloric acid is absorbed. Then 0.9 finely pulverised 6-aminonicotinic acid is added. The mixture is refluxed on an oil bath with occasional agitation, till all the acid goes into solution (about 3 hours). Most of the excess butylalcohol is now distilled off. The residue solidified on cooling. It is dissolved in 15 cc. water, filtered and made alkaline with dry sodium carbonate. An oil is separated out, which is collected and washed with water. The now solidified new substance, n-butyl- 6, aminonicotinic acid,

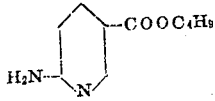

is recrystallized from ether-petrol ether mixture. It forms colorless prisms. M. P. 118—120° C. It is slightly soluble in water, soluble in alcohols, ether, insoluble in petrol ether.

The hydrochloride of the compound is very soluble in water.

*Example 4*

1.3 g. 6-aminonicotinic acid are dissolved in the theoretical amount of dilute potassium hydroxide. The solution is evaporated to dryness and pulverised. Now 1.9 g. B-chloro-ethyldiethyl-amine hydrochloride is dissolved in 5 cc. water, the solution made alkaline and the free amine is extracted in a separating funnel with ether. The ether solution is dried with flake caustic soda. To this solution the finely pulverised potassium 6-ethylamino-nicotinate is added and heated on the stem bath. After the ether evaporates, the sticky residue is heated with occasional stirring for 4 hour. After this time a solid residue remains which is placed in water, extracted with ether and washed several times. The new substance obtained from the ether solution forms a difficulty crystallizable oil.

The chemical reaction of the process is the following:

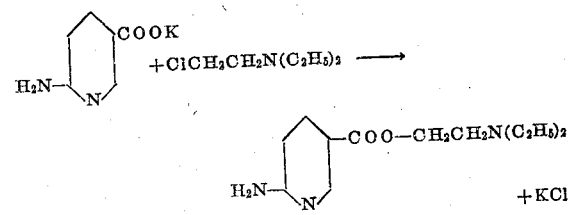

The dihydrochloride of this diethylaminoethyl-6, aminonicotinic acid is recrystallized from a mixture of isopropylalcohol and ethylacetate. It is soluble in alcohols, very soluble in water. It has no definite melting point. It begins to darken in the capillary tube at 200° C. and decomposes at 254–255° C.

The compounds prepared according to the methods described in the examples have anesthetic properties. When a small quantity is placed on the tongue, one will promptly observe a lasting anesthetic action. For testing purposes the hydrochloride and other salts of the compounds were prepared and 0.5–2% solutions were used. Rabbits' eyes were flooded with the solution for 1 minute. The anesthesia in most cases is quite prolonged. The toxicity tests prove that they are relatively non-toxic.

These new anesthetics can be used in aqueous solutions by dissolving their salts, the monohydrochlorides, dihydrochlorides and benzoates having preference over the other salts. The bases dissolved in oil of sweet almond or other suitable oils can be used for injections or can be incorporated into ointments.

By slight changing of the alkyl radicals many apparently widely different embodiments of this invention may be made without departing from the spirit thereof.

We do not limit ourselves to the specifically mentioned times, temperatures, quantities, chemicals, or steps of procedure as these are given simply to clearly describe our invention as set forth in our specification and claims, and they may be varied without going beyond the scope of our invention.

What we claim is:

1. As a medicinal compound having anaesthetic properties, an ester of an amino-nicotinic acid having the formula

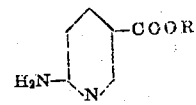

in which R is a radical of the group consisting of unsubstituted saturated alkyl and unsubstituted saturated alkyl amino alkyl.

2. As a medicinal compound having anaesthetic properties, the ester of an amino-nicotinic acid having the formula

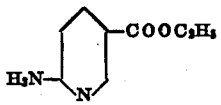

and its water soluble salts.

3. As a medicinal compound having anaesthetic properties, the ester of an amino-nicotinic acid having the formula

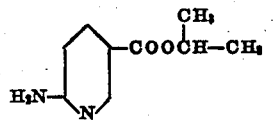

and its water soluble salts.

4. As a medicinal compound having anaesthetic properties, a water-soluble salt of the compound of claim 1.

5. As a medicinal compound having anaesthetic properties, a water-soluble salt of the compound of claim 2.

6. As a medicinal compound having anaesthetic properties, a water-soluble salt of the compound of claim 3.

7. As a medicinal compound having anaesthetic properties, the ester of an amino-nicotinic acid having the formula

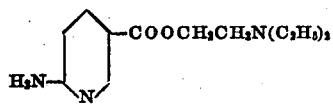

and its water soluble salts.

8. As a medicinal compound having anaesthetic properties, an ester of an amino-nicotinic acid having the formula

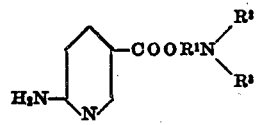

in which $R^1$ represents an alkyl group, $R^2$ and $R^3$ represent hydrogen or the same or different alkyl groups, these alkyl groups having not more than 6 carbon atoms, being unsubstituted and selected from a group of monovalent radicals derived from a saturated hydrocarbon.

9. As a medicinal compound having anaesthetic properties, a water soluble salt of the compound of claim 7.

RAEMER R. RENSHAW.
PAUL F. DREISBACH.